United States Patent Office 3,373,188
Patented Mar. 12, 1968

3,373,188
STORAGEABLE, POLYMERIZABLE COMPOSITIONS CONTAINING 2-HYDROXYALKYL ESTERS OF ETHYLENICALLY UNSATURATED CARBOXYLIC ACIDS AND PROCESS OF PREPARING THE SAME
Glenn R. Svoboda, Port Washington, Wis., assignor to Freeman Chemical Corporation, Port Washington, Wis., a corporation of Delaware
No Drawing. Filed June 22, 1964, Ser. No. 377,079
11 Claims. (Cl. 260—486)

This invention relates to a method for preparing polymerizable compositions of 2-hydroxyalkyl esters of ethylenically unsaturated carboxylic-acids, for example, 2-hydroxypropyl methacrylate and 2-hydroxyethyl methacrylate, in the presence of phenyl pyrazolidone, and to storageable compositions of the said 2-hydroxy alkyl esters containing a polymerization-inhibiting quantity of phenyl pyrazolidone. Phenyl pyrazolidone has the formula

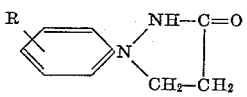

R is hydrogen or lower alkyl.

PRIOR ART

The present 2-hydroxyalkyl esters of ethylenically unsaturated carboxylic acids have the general formula

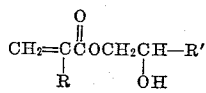

wherein R is a substituent selected from hydrogen and methyl radicals, and R' is a substituent selected from the class consisting of hydrogen, methyl and ethyl radicals. The esters are formed by esterification of acrylic acid or methacrylic acid with a 1,2-alkylene oxide selected from the class consisting of ethylene oxide, propylene oxide and butylene oxide. The present 2-hydroxyalkyl esters have utility as polymerizable monomers, not only for homopolymerization but especially for copolymerization in admixture with other polymerizable monomers containing a terminal >CH=CH$_2$ radicals, such as styrene, vinyl toluene, acrylates, methacrylates, acrylamide, acrylonitrile, et cetera. The present 2-hydroxyalkyl esters also are useful as cross-linking monomers in combination with unsaturated polyester resins (e.g., those which include maleic acid, fumaric acid and the like), diallyl phthalate, and the like.

The present invention concerns the process of preparing the 2-hydroxyalkyl esters, such as 2-hydroxypropyl methacrylate which is formed from reaction of 1,2-propylene oxide and methacrylic acid:

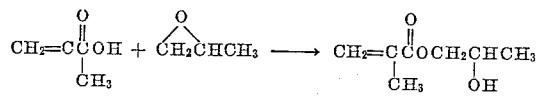

The 2-hydroxyalkyl esters heretofore available have suffered from one or more of the following deficiencies:

(a) *Dark color*.—The optimum color for polymerizable monomers is water-white;

(b) *High acid content*. — Commercially available sources of 2-hydroxyalkyl methacrylate contain from about 3 to 6 percent free methacrylic acid by weight;

(c) *Low purity*.—In addition to the contamination by unreacted acid, the available esters find as contaminants polyethers and diesters such as

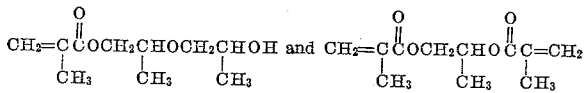

(d) *A dilemma*.—Between maintaining satisfactory storage properties and satisfactory curing properties.

The dilemma results from the fact that increased amounts of polymerization inhibitors increase the storage life of the monomer, yet the excessive inhibitor must be offset by greater quantities of catalyst in order to achieve polymerization (cure) when that is desired. Use of insufficient polymerization inhibitor to avoid the need for excessive curing catalyst endangers the monomer in storage by possible premature gelation.

THE PRESENT INVENTION

According to this invention, 2-hydroxyalkyl acrylates and methacrylates are prepared by reacting substantially equimolar quantities of the acid with 1,2-alkylene oxide such as ethylene oxide, propylene oxide, and butylene oxide in the presence of an ionic esterification catalyst and 1-phenyl-3-pyrazolidone. A molar excess of the alkylene oxide is desirable in the reaction system. A quaternary ammonium salt (halide or hydroxide) is a preferred ionic esterification catalyst. A mixture of triphenyl phosphine and triphenyl stibine may be used as the esterification catalyst. The phenyl pyrazolidone serves as an inhibitor of addition polymerization during the reaction and also subsequently during storage of the resulting polymerizable 2-hydroxyalkyl esters.

The polymerizable esters have particularly good stability on exposure to ultra-violet radiation, e.g., sunlight.

*Example 1.—Preparation of 2-hydroxylpropyl methacrylate (HPMA)*

1290 grams methacrylic acid (15.0 mols) were placed in a vessel with 22.9 grams tetramethylammonium chloride (one weight percent of the reactants) and 0.46 gram 1-phenyl-3-pyrazolidone (200 parts per million based on reactants). 1000 grams propylene oxide (17.25 mols) were added to the vessel and the contents were refluxed at about 62–68° C. for about 21 hours. The final acid value (before stripping) was 9.25. Following 25 minutes stripping, the acid value was 9.11. The contents of the vessel were removed after stripping and the viscosity was measured at 17.2 cps. (30° C.) The color (Gardner-Holdt scale) was less than 1.0, i.e., essentially water-white. The product contained 97.35 percent by weight of the 2-hydroxypropyl methacrylate and 0.34 percent by weight propylene glycol dimethacrylate.

The properties of the resulting 2-hydroxypropyl methacrylate are compared with two commercial sources of 2-hydroxypropyl methacrylate identified as Source "A" and Source "B" in the following Table I:

TABLE I.—PROPERTIES OF 2-HYDROXYPROPYL METHACRYLATE (HPMA)

| | Acid Value | Viscosity cps. at 30° C. | Color, Gardner-Holdt | Free Acid Content, Wt. Percent |
|---|---|---|---|---|
| Example I | 9.11 | 17.2 | 1 | 2.0 |
| Source "A" | 15.46 | 6.2 | 1 | 2.37 |
| Source "B" | 40 | 6.18 | 1 | 6.14 |

From Table I, it is seen that the product of this invention, Example I, has a lower free acid content (methacrylic acid) consistent with a clear, colorless composition than the commercially available sources of HPMA.

The HPMA product of Example 1 has excellent uncatalyzed stability, i.e., the material can be stored as such without fear of premature gelation. When the material is ready for use, a suitable addition-polymerization initiator is added to the polymerizable composition containing the HPMA (and the phenyl pyrazolidone). Such initiators typically are peroxy compounds such as benzoyl peroxide, tert-butyl peroxide, dicumyl peroxide, tert-butyl perbenzoate, cumene hydroperoxide, and the like. The present monomeric HPMA and other polymerizable 2-hydroxyalkyl esters, when inhibited with phenyl pyrazolidone, require less of the peroxy catalyst than the commercially available counterparts. Upon addition of the polymerization catalyst, the inhibiting properties of the phenyl pyrazolidone are offset and rapid gelation and curing occurs.

*Example II.—Preparation of 2-hydroxypropyl methacrylate (HPMA)*

278.6 pounds methacrylic acid (32.4 mols) were placed in a reaction kettle with 5 pounds tetramethylammonium chloride (one weight percent of reactants) and 45 grams 1-phenyl-3-pyrazolidone (200 parts per million based on reactants). 216.4 pounds propylene oxide (37.3 mols) were added incrementally to the kettle at 70–75° C. and reacted until the acid value of the kettle contents was 15.5. Approximately seven hours reaction time was required. The kettle contents were cooled to 60° C. and stripped for twenty minutes. After stripping the kettle contents had an acid value of 15.3. The kettle contents had a viscosity of 8.8 cps. (30° C.) and a color (Gardner-Holdt scale) less than 1.0, i.e., essentially water-white.

Analysis of the product revealed 93.07 percent by weight 2-hydroxypropyl methacrylate and 0.31 percent by weight propylene glycol dimethacrylate.

The HPMA product of Example II was compared with the HPMA which is available from commercial sources (identified as Source "A" and Source "B" in Table I above). Three specimens were exposed to sunlight to determine the effect of sunlight on gelation. HPMA from Source "A" gelled in four days. HPMA from Source "B" gelled in seven days. The HPMA from Example II exhibited no significant change in viscosity after two months of the sunlight exposure. Hence the HPMA product of Example II (containing phenyl pyrazolidone) possesses great resistance to premature gelation in storage.

*Example III.—Preparation of 2-hydroxyethyl methacrylate (HEMA)*

1720 grams methacrylic acid (20 mols) were placed in a vessel with 26 grams tetramethylammonium chloride (one weight percent of the reactants) and 0.52 gram 1-phenyl-3-pyrazolidone (200 parts per million based on reactants). 1000 grams ethylene oxide (23.24 mols) were added incrementally to the vessel between 55 and 60° C. The contents were maintained at 30° C. for forty hours to complete the reaction. The final acid value was 13.96. The kettle contents were stripped for 35 minutes and the resulting acid value of the kettle contents was 14.0. The viscosity was 7.6 cps. (30° C.). The Gardner-Holdt scale color was less than 1.0.

A portion of the product was placed in a dark bottle and stored for one week. At the end of the one-week storage, the acid value of the material had decreased from 14.0 to 0.30 without significant increase in the viscosity of the material.

Commercially available HEMA was compared with the product of Example III. The commercially available HEMA is identified as Source "C."

TABLE II.—PROPERTIES OF 2-HYDROXYETHYL METHACRYLATE (HEMA)

| | Acid Value | Viscosity cps. at 30° C. | Color, Gardner-Holdt | Free Acid Content, Wt. Percent |
|---|---|---|---|---|
| Example III | 0.30 | 7.6 | 1 | 0.05 |
| Source "C" | 14.19 | 8.2 | 1 | 2.2 |

The present HEMA contains significantly less unreacted methacrylic acid than the commercially available material.

Samples of the HEMA of Example III were compared with samples of the HEMA from Source "C" to determine resistance to premature gelation from sunlight. The HEMA from Source "C" gelled approximately four days after the sunlight exposure whereas there was not even any significant increase in the viscosity of the Example III HEMA after four days' sunlight exposure.

*Example IV.—Preparation of 2-hydroxybutyl methacrylate (HBMA)*

1290 grams methacrylic acid (15.0 mols) were placed in a vessel with 25.34 grams tetramethylammonium chloride (one weight percent of the reactants) and 0.51 gram 1-phenyl-3-pyrazolidone (200 parts per million based on reactants). 1284 grams 1,2-butylene oxide (17.81 mols) were added incrementally to the vessel at 65 to 70° C. and the contents reacted for about 26 hours. The final acid value was 8.85. The kettle contents were stripped for about thirty minutes and the resulting acid value was 8.20. The viscosity of the product was 10.7 cps. (30° C.). The Gardner-Holdt color was 3.0.

*Example V.—Preparation of 2-hydroxypropyl acrylate (HPA)*

1081 grams acrylic acid (15.0 mols) were placed in a vessel with 20.83 grams tetramethylammonium chloride (one weight percent of the reactants) and 0.42 gram 1-phenyl-3-pyrazolidone (200 parts per million based on reactants). 1002 grams propylene oxide (17.25 mols) were added incrementally to the vessel at 65 to 70° C. The vessel was maintained at about 65 to 70° C. for fifteen hours until the acid value was 9.85. The kettle contents were stripped for thirty minutes and the acid value was 8.85. Viscosity of the product was 9.5 cps. (30° C.). The color on Gardner-Holdt scale was less than 1.0.

The product of Example V was compared with commercially available 2-hydroxypropyl acrylate from Source "D," as set forth in the following Table III.

TABLE III.—PROPERTIES OF 2-HYDROXYL PROPYL ACRYLATE

| | Acid Value | Viscosity cps. at 30° C. | Color, Gardner-Holdt | Free Acid Content, Wt. Percent |
|---|---|---|---|---|
| Example V | 8.85 | 9.5 | 1 | 1.4 |
| Source "D" | 2.68 | 10.5 | 1 | 0.41 |

*Example VI.—Preparation of 2-hydroxypropyl methacrylate with triphenyl phosphine catalyst*

1290 grams methacrylic acid (15.0 mols) were placed in a vessel with 34.38 grams triphenyl phosphine (1.5 weight percent based on reactants) and 0.4585 grams 1-phenyl-3-pyrazolidone (200 parts per million based on the weight of reactants). 1002 grams propylene oxide (17.25 mols) were added incrementally over three hours to the vessel at 70° C. The vessel was maintained at 70° C. for an additional 8.5 hours. The final acid value was 15.93. After stripping the vessel contents for 35 minutes, the acid value was 13.8. The contents of the vessel had a viscosity of 10.2 cps. (30° C.) and a color on the Gardner-Holdt scale less than 1, i.e., essentially water-white.

*Example VII.—Preparation of 2-hydroxypropyl methacrylate with 1-phenyl-(4 methyl)-3-pyrazolidone*

1290 grams methacrylic acid (15.0 mols) were placed in a vessel with 22.92 grams tetramethylammonium chloride (one weight percent based on reactants) and 0.4584 gram 1-phenyl-4(4-methyl)-3-pyrazolidone (200 parts per million based on the weight of reactants). 1002 grams propylene oxide were added to the vessel and the contents refluxed at about 58 to 66° C. for about 21 hours until the acid value diminished to 9.54. The vessel contents were stripped for about 20 minutes and the acid number reduced to 8.64. The vessel contents had a viscosity of 77 cps. (30° C.) and a Gardner-Holdt color less than 1.

GENERAL

The amount of phenyl pyrazolidone required in the polymerizable 2-hydroxyalkyl esters is in the range of about 10 to 10,000 parts per million of reactants or product, i.e., from about 0.001 to 1.0 percent, and preferably from about 50 to 5,000 parts per million, i.e., from about 0.005 to 0.5 weight percent.

The preferred reaction catalyst for the present esterification is a quaternary ammonium halide such as tetramethyl ammonium chloride. Other useful catalysts include tetramethyl ammonium hydroxide and benzyl trimethyl ammonium hydroxide. Typically the catalyst concentration is from about 0.1 to about 3.0 weight percent of the reactants. Triphenyl phosphine, triphenyl stibine and their mixtures are also useful catalysts.

As in the examples, a slight excess of alkylene oxide will be provided for the reaction with the acrylic or methacrylic acid. The reactants are refluxed at atmospheric pressure (or, in the case of ethylene oxide, at a slightly elevated pressure, about eight inches of water). All of the alkylene oxide may be added initially (as in Example 1) or, desirably, the alkylene oxide may be added incrementally to the reaction kettle.

The final acid number of the esterification reaction product in the range of about 5 to 20 is preferred. Diacrylate contamination results when the acid number is forced to very low values via esterification.

I claim:

1. A storageable, polymerizable composition comprising essentially (a) monomeric ester having the formula

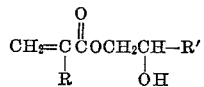

wherein R is a substituent selected from the class consisting of hydrogen and methyl radical and R' is a substituent selected from the class consisting of hydrogen, methyl and ethyl radical; and (b) a polymerization-inhibiting quantity of phenyl pyrazolidone.

2. A storageable, polymerizable composition comprising essentially 2-hydroxyalkyl methacrylate and a polymerization-inhibiting quantity of phenyl pyrazolidone.

3. A storageable, polymerizable composition comprising essentially 2-hydroxyalkyl acrylate and a polymerization-inhibiting quantity of phenyl pyrazolidone.

4. A composition of matter comprising essentially monomeric 2-hydroxypropyl methacrylate and a polymerization inhibiting quantity from 0.001 to 1.0 percent by weight, based upon the said methacrylate, of phenyl pyrazolidone.

5. A composition of matter comprising essentially monomeric 2-hydroxy ethyl methacrylate and a polymerization-inhibiting quantity from 0.001 to 1.0 percent by weight, based upon the said methacrylate, of phenyl pyrazolidone.

6. A composition of matter comprising essentially monomeric 2-hydroxybutyl methacrylate and a polymerization-inhibiting quantity from 0.001 to 1.0 percent by weight, based upon the said methacrylate, of phenyl pyrazolidone.

7. A composition of matter comprising essentially monomeric 2-hydroxypropyl acrylate and a polymerization-inhibiting quantity from 0.001 to 1.0 percent by weight, based upon the said acrylate, of phenyl pyrazolidone.

8. In the method of preparing a storageable, polymerizable ester having the formula

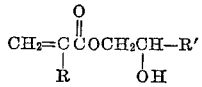

wherein R is a substituent selected from the class consisting of hydrogen and methyl radical and R' is a substituent selected from the class consisting of hydrogen, methyl and ethyl radical; which comprises esterifying 1,2-alkylene oxide selected from the class consisting of ethylene oxide, propylene oxide and butylene oxide with a carboxylic acid selected from the class consisting of acrylic acid and methacrylic acid, the improvement comprising:

carrying out said esterification in the presence of a polymerization inhibiting quantity from about 0.01 to about 1.0 percent by weight, based on esterification reactants, of phenyl pyrazolidone; and recovering substantially colorless, storageable, polymerizable ester containing the said phenyl pyrazolidone.

9. The improvement of claim 8 wherein the said reactants are combined in the presence of an ionic esterification catalyst.

10. The improvement of claim 9 wherein the said ionic esterification catalyst is tetramethyl ammonium chloride.

11. The improvement of claim 9 wherein the said ionic esterification catalyst is selected from the class consisting of triphenyl phosphine, triphenyl stibine and mixtures thereof.

References Cited

UNITED STATES PATENTS

| | | | |
|---|---|---|---|
| 3,041,371 | 6/1962 | Goldsmith et al. | 260—486 |
| 3,059,024 | 10/1962 | Goldberg et al. | 260—486 |
| 3,187,059 | 6/1965 | Bailey et al. | 260—652.5 |

LORRAINE A. WEINBERGER, *Primary Examiner.*

RICHARD K. JACKSON, *Examiner.*

A. P. HALLUIN, *Assistant Examiner.*